US008804729B1

(12) United States Patent
Melman et al.

(10) Patent No.: US 8,804,729 B1
(45) Date of Patent: Aug. 12, 2014

(54) IPV4, IPV6, AND ARP SPOOFING PROTECTION METHOD

(75) Inventors: David Melman, D.N. Bikat Beit Hakerem (IL); Tsahi Daniel, Tel-Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1502 days.

(21) Appl. No.: 11/357,630

(22) Filed: Feb. 16, 2006

(51) Int. Cl.
*H04L 9/32* (2006.01)
*H04L 29/06* (2006.01)

(52) U.S. Cl.
CPC ................................. *H04L 63/1466* (2013.01)
USPC ............... 370/392; 370/389; 726/11; 726/13; 709/238

(58) Field of Classification Search
CPC . H04L 63/14; H04L 63/1408; H04L 63/1416; H04L 63/1441; H04L 63/1466
USPC .............. 370/392, 352, 389; 726/713, 11, 13; 709/242, 238
See application file for complete search history.

(56) References Cited

U.S. PATENT DOCUMENTS

| | | | |
|---|---|---|---|
| 6,771,649 B1 * | 8/2004 | Tripunitara et al. ...... | 370/395.54 |
| 7,134,012 B2 * | 11/2006 | Doyle et al. .................. | 713/151 |
| 7,234,163 B1 * | 6/2007 | Rayes et al. ..................... | 726/22 |
| 7,257,104 B2 * | 8/2007 | Shitama ......................... | 370/338 |
| 7,342,926 B2 * | 3/2008 | Uskela et al. ................. | 370/392 |
| 7,346,057 B2 * | 3/2008 | Foschiano et al. ............ | 370/392 |
| 7,360,245 B1 * | 4/2008 | Ramachandran et al. ...... | 726/13 |
| 7,464,183 B1 * | 12/2008 | Ioffe et al. ..................... | 709/245 |
| 7,490,351 B1 * | 2/2009 | Caves et al. ..................... | 726/13 |
| 7,562,390 B1 * | 7/2009 | Kwan ............................... | 726/23 |
| 2003/0009585 A1 * | 1/2003 | Antoine et al. ............... | 709/238 |
| 2003/0110288 A1 * | 6/2003 | Ramanujan et al. .......... | 709/238 |
| 2004/0049714 A1 * | 3/2004 | Marples et al. .................. | 714/43 |
| 2004/0062267 A1 * | 4/2004 | Minami et al. ................. | 370/463 |
| 2004/0162915 A1 * | 8/2004 | Caronni et al. ............... | 709/245 |
| 2004/0181694 A1 * | 9/2004 | Cox et al. ....................... | 713/201 |
| 2005/0237970 A1 * | 10/2005 | Inoue ............................. | 370/328 |
| 2006/0088037 A1 * | 4/2006 | Finley et al. ............. | 370/395.54 |
| 2006/0209818 A1 * | 9/2006 | Purser ............................ | 370/389 |
| 2006/0248229 A1 * | 11/2006 | Saunderson et al. .......... | 709/245 |

OTHER PUBLICATIONS

Plummer, "An Ethernet Address Resolution Protocol", Nov. 1982.*
(Ying, Wallace,"A Preprocessor Plugin for SNORT: IP Spoof Detector"; Published: Apr. 22, 2002).*

* cited by examiner

*Primary Examiner* — Ayaz Sheikh
*Assistant Examiner* — Tarell Hampton

(57) ABSTRACT

A method of detecting address spoofing includes receiving an ARP packet at a network device. The ARP packet includes a first address associated with a first network layer and a second address associated with a second network layer. The method also includes accessing a first memory searchable by the first address to obtain a memory reference and retrieving a third address associated with the second network layer from a second memory using the memory reference. The method further includes comparing the second address with the third address and detecting address spoofing if a match is not present between the second address and the third address.

12 Claims, 4 Drawing Sheets

IPV4, IPV6, AND ARP SPOOFING PROTECTION METHOD

BACKGROUND OF THE INVENTION

The present invention relates generally to methods of providing network security. More particularly, the invention provides methods and systems for protecting a network from spoofing and denial of service attacks. But it would be recognized that the invention has a much broader range of applicability.

An Address Resolution Protocol (ARP) packet is a layer 2 packet used in IP communications networks to map a network layer protocol address to a data link layer hardware address. For example, ARP is used to map a device's IP address (Layer 3) to the device's MAC address (Layer 2). An ARP packet is not an IP packet, but its payload contains IP information, namely, the sender's IP address and the target IP address.

In an Ethernet network, a source host communicates with a destination host using the Ethernet address (MAC address) of the destination host. Given a destination IP address, a host may use ARP to determine the corresponding destination MAC address. As an example, when a first host or station (station A) wants to communicate with a second host or station (station B), station A will send an ARP broadcast packet that includes, among other fields, the destination (station B's) IP address. Each host in the local network receives this packet. Preferably, the host or station with the specified destination IP address (in this example, station B) responds with a unicast ARP reply packet back to station A that contains station B's MAC address. Once station B's ARP reply is received, station A is able to send packets directly to station B using the MAC address sent by station B in the ARP reply.

In a spoofing attack, a third station or host, for example, station C, responds to the ARP broadcast packet, or sends a "gratuitous ARP reply," spoofing station B's MAC address. In this scenario, station C responds with an ARP reply packet that contains station B's IP address, but station C's MAC address. Accordingly, station A sends network traffic intended for station B to station C. As a result of station C spoofing station B's MAC address, station C is able to steal network traffic intended for station B. In an alternative scenario, several reply packets are received, from both stations B and C. For example, station B may also send a ARP reply packet, either before or after station C. Station C may subsequently send an additional ARP reply packet, overriding the information sent by station B. One of ordinary skill in the art will appreciate that a number of spoofing scenarios are possible. In the alternative scenario, as well as other scenario's, station B is denied some or all of its traffic.

Thus, there is a need in the art for methods and systems to ensure a reliable correspondence between a host's Layer 2 MAC address and the host's Layer 3 IP address.

SUMMARY OF THE INVENTION

According to the present invention, methods of providing network security are provided. More particularly, the invention provides methods and systems for protecting a network from spoofing and denial of service attacks. Merely by way of example, the invention has been applied address verification of both ARP packets and bridged or routed IPv4 and IPv6 packets. But it would be recognized that the invention has a much broader range of applicability.

According to an embodiment of the present invention, a method of detecting address spoofing is provided. The method includes receiving an ARP packet at a network device. The ARP packet includes a first address associated with a first network layer and a second address associated with a second network layer. The method also includes accessing a first memory searchable by the first address to obtain a memory reference and retrieving a third address associated with the second network layer from a second memory using the memory reference. The method further includes comparing the second address with the third address and detecting address spoofing if a match is not present between the second address and the third address.

According to another embodiment of the present invention, a method of detecting MAC address spoofing in a telecommunications network is provided. The method includes receiving an IP packet at a port of a first network device. The IP packet includes a source IP address and a MAC source address. The method also includes accessing a route entry associated with the source IP address and retrieving a pointer from the route entry. The method further includes retrieving an ARP MAC address associated with the pointer and detecting MAC address spoofing if the MAC source address does not match the ARP MAC address.

According to yet another embodiment of the present invention, a method of detecting address spoofing in a telecommunications network is provided. The method includes receiving a packet at an ingress port of a network device. The packet includes a source IP address and a MAC source address. The method also includes accessing a route entry in an IP Lookup Table. The route entry is associated with the source IP address. The method further includes retrieving an ARP pointer from the entry in the IP Lookup Table and retrieving an ARP MAC address from an ARP Table. The ARP MAC address is associated with the ARP pointer. The method additionally includes determining if the MAC source address matches the ARP MAC address.

According to an alternative embodiment of the present invention, a network device is provided. The network device includes an ingress port adapted to receive an ARP packet. The ARP packet includes a first address associated with a first network layer and a second address associated with a second network layer. The network device also includes a first memory searchable by the first address. The first memory includes a memory reference. The network device further includes a second memory searchable by the memory reference and a memory interface configured to retrieve a third address associated with the second network layer from the second memory using the memory reference. The network device additionally includes a comparator configured to compare the second address with the third address and a spoofing detector configured to detect address spoofing if a match is not present between the second address and the third address.

According to another alternative embodiment of the present invention, a network device in a telecommunications network is provided. The network device includes a port adapted to receive a packet. The packet includes a source IP address and a MAC source address. The network device also includes a memory interface adapted to access a route entry associated with the source IP address, retrieve a pointer from the route entry, and retrieve an ARP MAC address associated with the pointer. The network device further includes a spoofing detector configured to detect MAC address spoofing if the MAC source address does not match the ARP MAC address.

According to yet another alternative embodiment of the present invention, a network device is provided. The network device includes an ingress port adapted to receive a packet. The packet includes a source IP address and a MAC source address. The network device also includes an IP Lookup Table searchable by the source IP address. The IP Lookup Table includes a route entry associated with the source IP address and the route entry includes an ARP pointer. The network device further includes an ARP Table indexed by the ARP pointer and including an ARP MAC address. The network device additionally includes a memory interface configured to retrieve the ARP pointer from the route entry associated with the source IP address and retrieve an ARP MAC address associated with the ARP pointer. The network device additionally includes a comparator configured to determine if the MAC source address matches the ARP MAC address.

According to a specific embodiment of the present invention, a network device is provided. The network device includes means for receiving an ARP packet at a network device. The ARP packet includes a first address associated with a first network layer and a second address associated with a second network layer. The network device also includes means for accessing a first memory searchable by the first address to obtain a memory reference and means for retrieving a third address associated with the second network layer from a second memory using the memory reference. The network device further includes means for comparing the second address with the third address and means for detecting address spoofing if a match is not present between the second address and the third address.

According to another specific embodiment of the present invention, a network device in a telecommunications network is provided. The network device includes means for receiving an IP packet at a port of a first network device. The IP packet includes a source IP address and a MAC source address. The network device also includes means for accessing a route entry associated with the source IP address and means for retrieving a pointer from the route entry. The network device further includes means for retrieving an ARP MAC address associated with the pointer and means for detecting MAC address spoofing if the MAC source address does not match the ARP MAC address.

According to yet another specific embodiment of the present invention, a network device is provided. The network device includes means for receiving a packet at an ingress port of a network device. The packet includes a source IP address and a MAC source address. The network device also includes means for accessing a route entry in an IP Lookup Table. The route entry is associated with the source IP address. The network device further includes means for retrieving an ARP pointer from the entry in the IP Lookup Table and means for retrieving an ARP MAC address from an ARP Table. The ARP MAC address is associated with the ARP pointer. The network device additionally includes means for determining if the MAC source address matches the ARP MAC address.

Still other embodiments of the present invention may be implemented in code, for example, by a digital signal processor (DSP). One such embodiment includes code for detecting address spoofing. The embodiment includes code for receiving an ARP packet at a network device. The ARP packet includes a first address associated with a first network layer and a second address associated with a second network layer. The embodiment also includes code for accessing a first memory searchable by the first address to obtain a memory reference and code for retrieving a third address associated with the second network layer from a second memory using the memory reference. The embodiment further includes code for comparing the second address with the third address and code for detecting address spoofing if a match is not present between the second address and the third address Another embodiment implemented in code includes code for detecting MAC address spoofing in a telecommunications network. The embodiment includes code for receiving an IP packet at a port of a first network device. The IP packet includes a source IP address and a MAC source address. The embodiment also includes code for accessing a route entry associated with the source IP address and code for retrieving a pointer from the route entry. The embodiment further includes code for retrieving an ARP MAC address associated with the pointer and code for detecting MAC address spoofing if the MAC source address does not match the ARP MAC address.

Yet another embodiment implemented in code includes code for detecting address spoofing in a telecommunications network. The embodiment includes code for receiving a packet at an ingress port of a network device. The packet includes a source IP address and a MAC source address. The embodiment also includes code for accessing a route entry in an IP Lookup Table. The route entry is associated with the source IP address. The embodiment further includes code for retrieving an ARP pointer from the entry in the IP Lookup Table and code for retrieving an ARP MAC address from an ARP Table. The ARP MAC address is associated with the ARP pointer. The embodiment additionally includes code for determining if the MAC source address matches the ARP MAC address.

Many benefits are achieved by way of the present invention over conventional techniques. For example, embodiments of the present invention provide protection against spoofing and denial of service attacks. Moreover, benefits include detecting such attacks by sending violating packets to the system CPU for logging and further analysis and action. As an example, an ingress port may be disabled. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
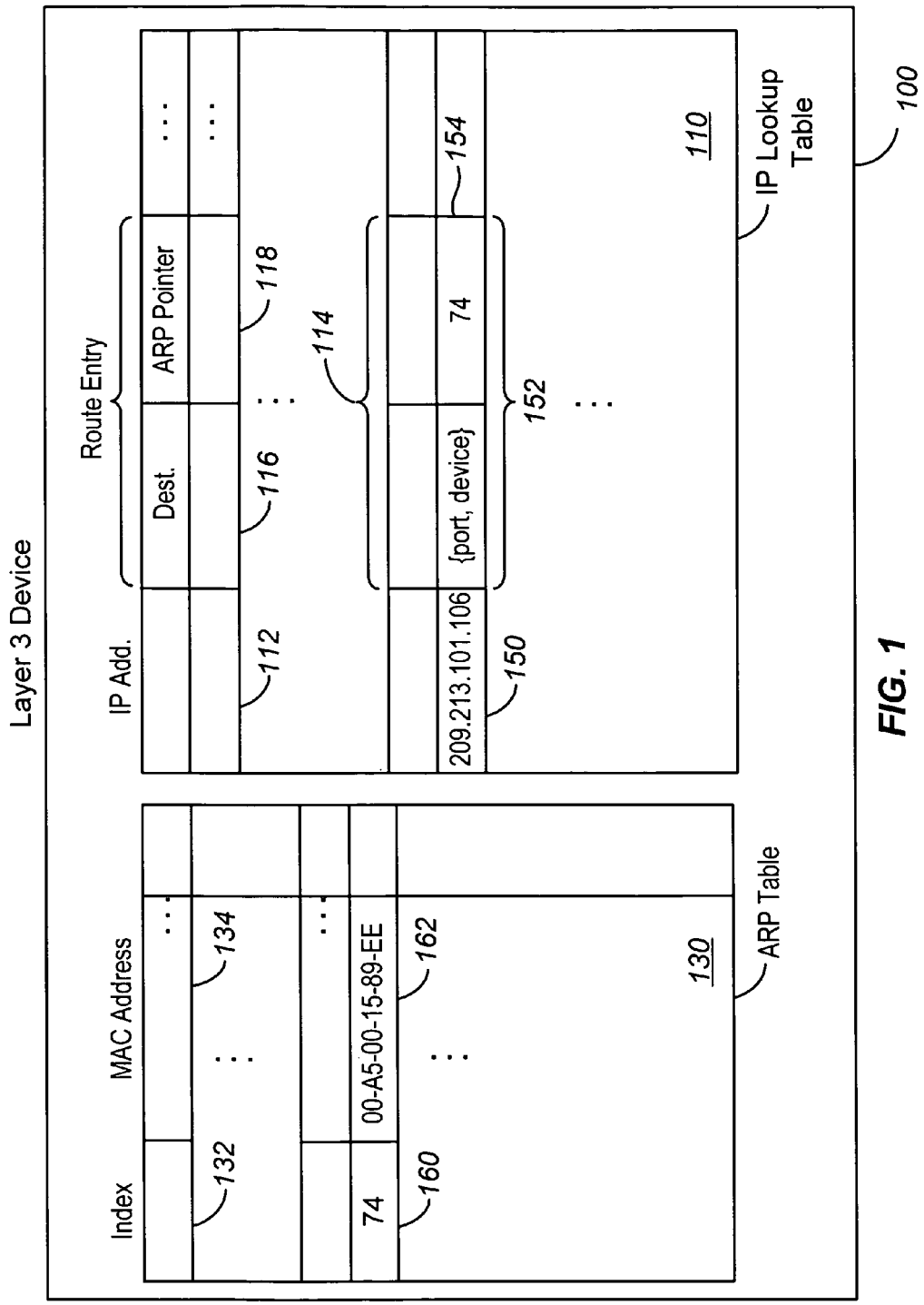
FIG. 1 is a simplified schematic illustration of two memories of a Layer 3 network device according to an embodiment of the present invention.

FIG. 1 is a simplified schematic illustration of two memories of a Layer 3 network device according to an embodiment of the present invention. Layer 3 network devices such as routers, switches, bridges, and the like, are represented by the device illustrated in FIG. 1. The Layer 3 network device 100 includes a Route Entry Table, herein referred to as an IP Lookup Table 110. The IP Lookup Table includes a number of entries indexed by IP address 112 and utilized to route packets through the network device. Alternatively, the IP Lookup Table may be searched using a longest prefix match to identify a given source IP (SIP) address. As discussed in relation to FIG. 4, the Layer 3 network device may contain one or more engines adapted to perform various functions utilizing information related to network packets.

Referring to FIG. 1, the IP Lookup Table 110 includes a number of route entries 114 associated with each of the IP addresses 112. The route entries, which include next hop route entries, contain the next hop destination device information 116 (e.g., {port, device}) as well as information related to the MAC destination address (DA). In particular, the route entry 114 includes a next hop ARP pointer 118, which serves as a pointer to an entry in an ARP Table 130, described more fully below. Thus, the ARP pointer 118 indicates the MAC DA of the packet. As will be evident to one of skill in the art, during routing of packets by the network device, the packet's header is reconstructed and the MAC DA is modified to reflect the next-hop MAC Address. As described more fully throughout the present specification, the ARP pointer is utilized in methods that detect spoofing of non-routed packets, such as ARP packets. According to these methods, for non-routed packets, unlike routed packets, the MAC DA is not modified. The IP Lookup Table may contain other entries, illustrated by the ellipsis in FIG. 1. Consequently, the size of the IP Lookup Table will depend on the number of entries and the amount of information associated with each entry.

The Layer 3 network device 100 also includes an ARP Table 130, sometimes referred to as an ARP MAC DA table. The ARP Table 130 includes, among other entries, an indexed list of MAC destination addresses (DAs) 134. Generally, the MAC DAs 134 are 6-byte (48-bit) MAC addresses. The size of the ARP Table 130 will depend on the particular applications. In some Layer 3 devices, the ARP Table is a 1K-entry table, although this is not required by the present invention. In some embodiments of the present invention, Layer 2 devices use the IP Lookup Table and the ARP Table to perform spoof detection and prevention, even though, as will be evident to one of skill in the art, such Layer 2 devices do not perform Layer 3 routing functions.

Thus, referring to FIG. 1, for a given IP address 112, the next hop route entry 114 associated with the given IP address contains an ARP pointer 118. The ARP pointer 118 serves as an index 132 to the MAC DA 134 for the given IP address. As described more fully below, embodiments of the present invention compare a packet's Layer 2 MAC source address, received from a network user, to the MAC address provided in the ARP Table 130 and associated with the Layer 3 source IP address in the IP Lookup Table 110 to protect the network against spoofing.

As illustrated in FIG. 1, both the IP Lookup Table 110 and the ARP Table 130 are represented as separate memories or memory partitions included in the Layer 3 device, such as a router or switch. However, this is not required by the present invention, as one or more of the tables may be provided in one or more memories external to the Layer 3 device. As mentioned above, Layer 2 devices use the IP Lookup Table and the ARP Table in some embodiments to perform spoof detection and prevention. Additionally, although the tables are illustrated as provided in individual memories in FIG. 1, the tables may be combined in a single database in a single memory. One of ordinary skill in the art would recognize many variations, modifications, and alternatives.

Figure 2:
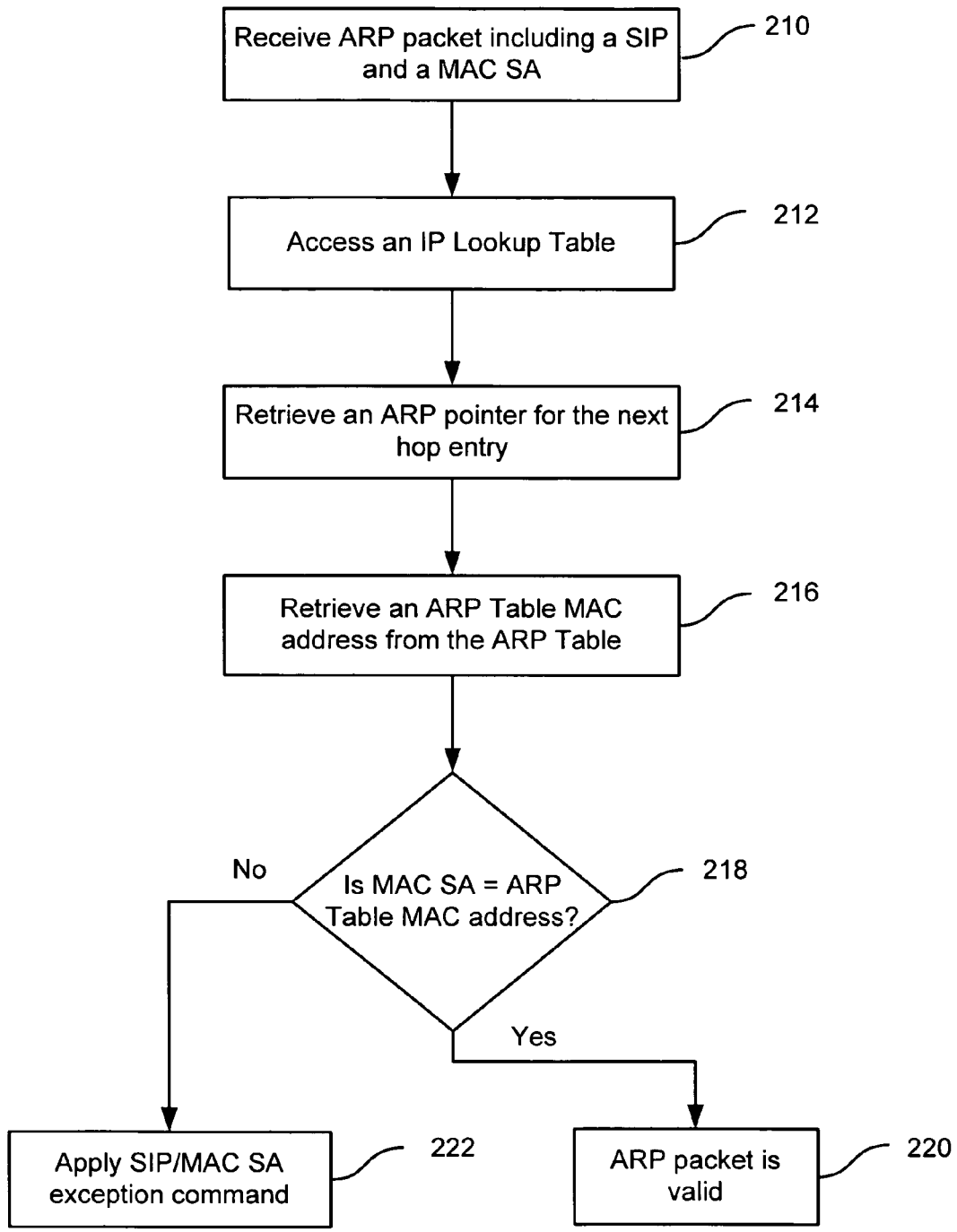
FIG. 2 is a simplified flowchart illustrating a method of detecting ARP spoofing according to an embodiment of the present invention.

FIG. 2 is a simplified flowchart illustrating a method of detecting ARP spoofing according to an embodiment of the present invention. A packet is received (210) by the Layer 3 device. It should be noted that in alternative embodiments, the packet is received at a Layer 2 device. The ARP packet, typically an ARP reply packet, includes a SIP address and a MAC source address (SA). As will be evident to one of skill in the art, an ARP packet contains two instances of the Layer 2 MAC SA, one in the MAC header and one in the ARP payload. As discussed above, the ARP reply packet is provided by a host in response to an ARP broadcast packet or as a gratuitous ARP reply packet. Embodiments of the present invention prevent ARP spoofing by verifying that the MAC SA in the ARP reply packet corresponds to the SIP address.

Although the ARP reply packet is not routed, the Layer 3 route entry table (IP Lookup Table 110) is used to compare the MAC SA of the packet to the MAC address 134 stored in the ARP table 130. Using the SIP address contained in the ARP reply packet, a memory interface looks up the SIP address in the Layer 3 device IP Lookup Table (212). This process provides access to a next hop route entry in the IP Lookup Table that is associated with the SIP address. As discussed in relation to FIG. 1, the next hop route entry includes an ARP pointer. The memory interface retrieves the ARP pointer (214), which is associated with the SIP address, and utilizes the ARP pointer to retrieve an ARP Table MAC address from the ARP Table (216). Thus, embodiments of the present invention provide access to two MAC addresses from two different sources.

The first MAC address is the MAC SA included in the ARP reply packet. As discussed above, the MAC SA may be the MAC address associated with a spoofer and not the destination host. The second MAC address, which is used as a standard, is the ARP Table MAC address listed in the ARP Table and accessed using the ARP pointer found in the IP Lookup Table. The accuracy of the ARP Table MAC address is provided as a result of the configuration procedure performed by the Layer 3 device. Generally, the configuration procedure determines the MAC information for the next hop entry in the IP Lookup Table when the CPU coupled to the device issues an ARP broadcast and receives an ARP reply from the station. Utilizing this IP address to MAC address mapping learned during the configuration procedure, future packets with a given IP address should map to the same MAC address.

The MAC SA is compared to the ARP Table MAC address (218) to determine if there is a match between the two MAC addresses. If a match is found, then the ARP reply packet is valid and future packets destined for the SIP address present in the ARP reply packet will be routed using the MAC source address. If, on the other hand, the two MAC addresses do not match, the ARP reply packet is considered a spoofed packet and a SIP/MAC SA exception command is applied (222).

The above sequence of steps provides a method of detecting ARP spoofing according to an embodiment of the present invention. As shown, the method uses a combination of steps including a way of comparing MAC source addresses obtained from two different sources. Other alternatives can also be provided where steps are added, one or more steps are removed, or one or more steps are provided in a different sequence without departing from the scope of the claims herein. One of ordinary skill in the art would recognize many variations, modifications, and alternatives.

Referring once again to FIG. 1, the following example illustrates a method of detecting ARP spoofing. A packet is received at the network device 100 with a SIP address of 209.213.101.106 and a MAC SA of 00-A5-00-15-89-EE. In a specific embodiment, the packet is an ARP reply packet and the MAC SA may be an incorrect or spoofed MAC address. As an example, the SIP address may be included in the ARP packet payload and the MAC SA may in be the MAC header for the ARP packet. In order to detect and prevent spoofing, the MAC SA is verified as follows. Using the SIP address 150, the IP Lookup Table 110 is accessed and the next hop route entry 152 is retrieved, including the ARP pointer 154 with a value of "74." The ARP pointer 154 is used to access the ARP Table 130 and particularly the record indexed by the value of "74," shown with reference numeral 160. The MAC address 162 has a value of 00-00-00-A5-89-E0.

The MAC address 162 is compared to the MAC SA included in the received packet. In this example, the two MAC addresses do not match and a determination is made that the packet is a spoof packet with an incorrect MAC address. In other words, the ARP reply packet was not sent by the device with the MAC address learned by the Layer 3 device 100 and associated with the IP address 150 during the device configuration process. An alarm is generated in response to the detection of this spoof packet and further actions are taken by various network components as appropriate. For example, the packet may be trapped to the CPU or dropped. One of ordinary skill in the art would recognize many variations, modifications, and alternatives.

As illustrated by this example, embodiments of the present invention provide methods and systems to ensure that once a mapping is created between an IP address and a MAC address, any future packets received at the network device with this IP address either have the same MAC address or result in the generation of a mismatch alarm. Thus, spoofing attacks and other network security risks are prevented.

In addition to providing protection against ARP spoofing, embodiments of the present invention provide Layer 3 address spoofing protection for bridged or routed IP packets. As an example, the packet may be an IPv4 packet or an IPv6 packet that is bridged within the same VLAN. Additionally, the packet may be a routed IPv4 packet or IPv6 packet. IPv4 and IPv6 packets are Ethernet packets that contain a MAC SA and a SIP address. Thus, methods and systems are provided to ensure that for IP traffic, the SIP address of the packet correctly corresponds to the MAC SA of the packet. Accordingly, IP spoofing, in addition to ARP spoofing is prevented using embodiments of the present invention.

Figure 3:
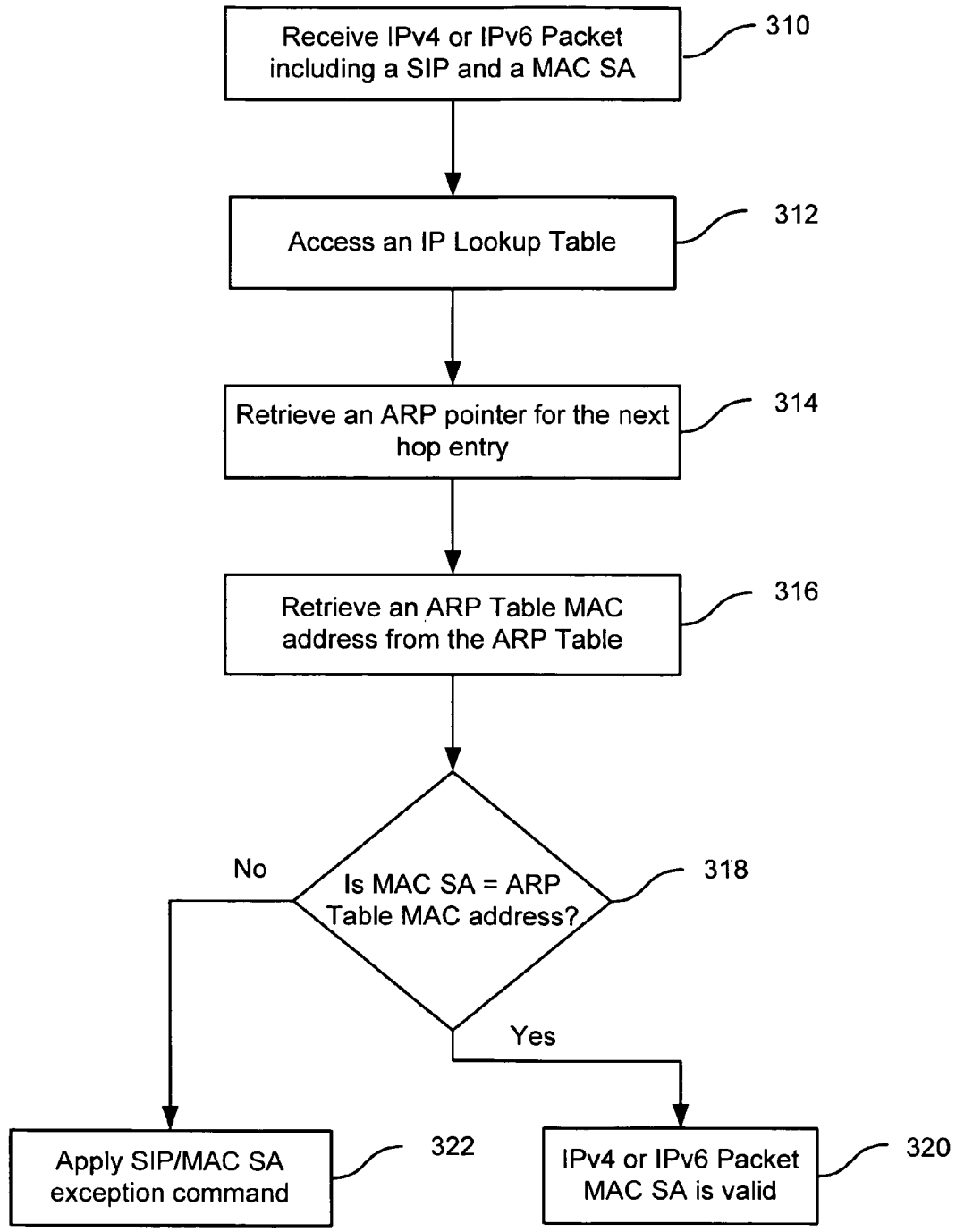
FIG. 3 is a simplified flowchart illustrating a method of detecting IP spoofing according to an embodiment of the present invention.

FIG. 3 is a simplified flowchart illustrating a method of detecting IP address spoofing according to an embodiment of the present invention. An IP packet is received (310) that includes both a SIP address and a MAC SA. In this example, the MAC SA included in the IP packet header may be provided by a spoofer and therefore not actually correspond to the SIP address.

Using the SIP address contained in the IP packet header, a memory interface looks up the SIP address in the Layer 3 device IP Lookup Table (312). This process provides access to a next hop route entry in the IP Lookup Table that is associated with the source IP address. As discussed in relation to FIG. 1, the next hop route entry includes an ARP pointer. The memory interface retrieves the ARP pointer (314), which is associated with the SIP address, and utilizes the ARP pointer to retrieve an ARP Table MAC address from the ARP Table (316). Thus, embodiments of the present invention provide two MAC addresses from two different sources.

The MAC SA included in the packet header is compared to the ARP Table MAC address (318) to determine if there is a match between the two MAC addresses. If a match is found, then the packet is processed (320) through the network as appropriate. If, on the other hand, the two MAC addresses do not match, the ARP reply packet is considered a spoofed packet and a SIP/MAC SA exception command is applied (322).

The above sequence of steps provides a method of detecting IP spoofing according to an embodiment of the present invention. As shown, the method uses a combination of steps including a way of comparing MAC source addresses obtained from two different sources. Other alternatives can also be provided where steps are added, one or more steps are removed, or one or more steps are provided in a different sequence without departing from the scope of the claims herein. One of ordinary skill in the art would recognize many variations, modifications, and alternatives.

Entries in the IP Lookup Table are dynamic and will preferably be aged. As an example, in a network running DHCP, a computer, with a first MAC address, may be moved from one location to another, requesting an IP address at each location. As new IP addresses are assigned at new locations, the IP Lookup Table will be updated to include this new information. Moreover, as additional computers, which have different MAC addresses, are connected to the network, the additional computers will receive IP addresses using DHCP. In some cases, an IP address may be assigned to a first computer, with a first MAC address, at a first time and a second computer, with a second MAC address at a second time. Accordingly, aging of entries in the IP Lookup Table is provided according to embodiments of the present invention so that if the IP address is not active for a predetermined period of time, entries in the IP Lookup table will be removed.

Figure 4:
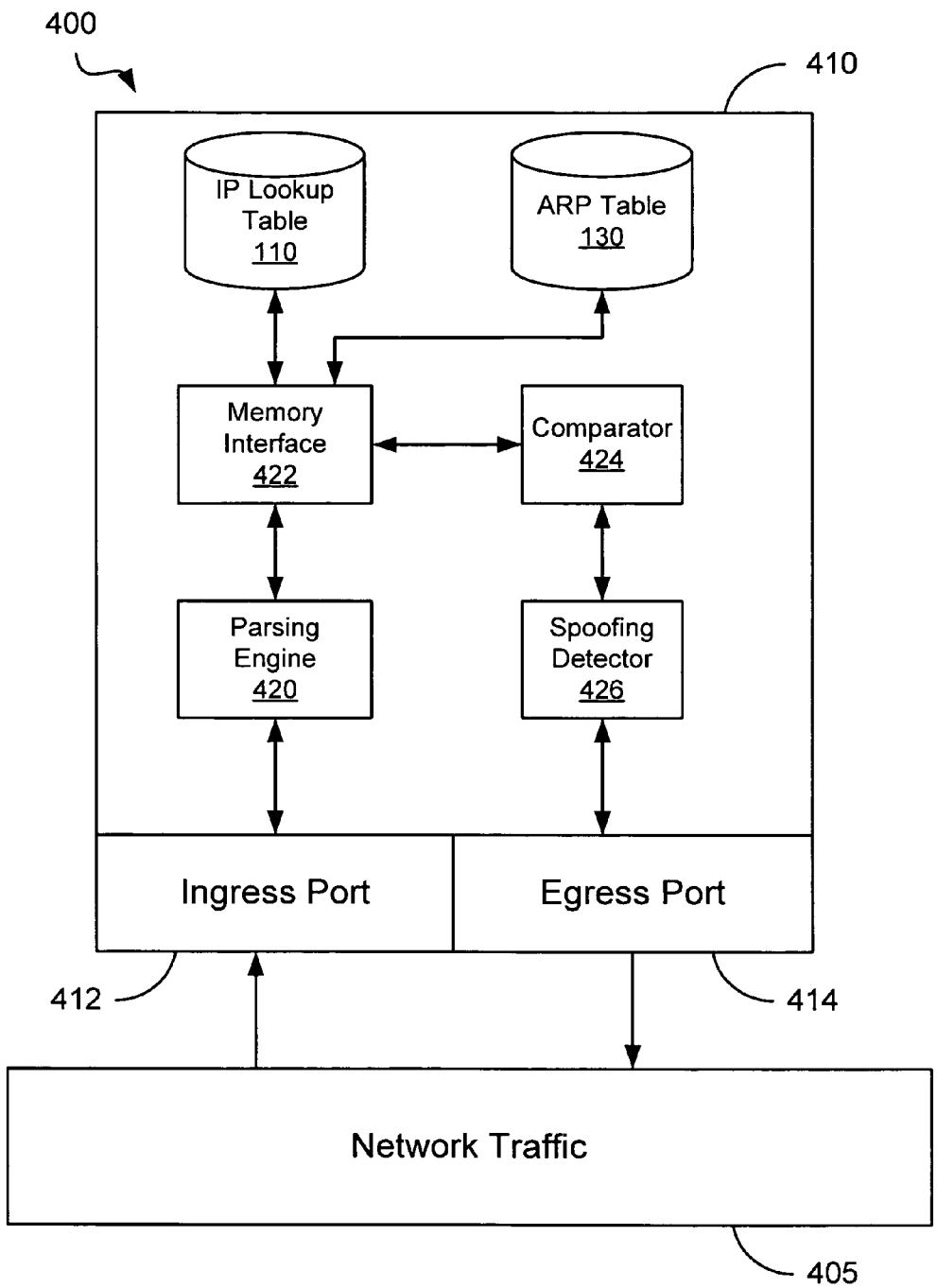
FIG. 4 is a block diagram of a network device in accordance with an embodiment of the present invention.

FIG. 4 is a block diagram of a network device in accordance with an embodiment of the present invention. The network device may be a Layer 3 network device as discussed in relation to FIG. 1. As illustrated in the block diagram 400, a data packet from the network 405 enters the device 410 through an ingress port 412. The data packet is then processed by a parsing engine 420. The parsing engine 420 extracts, for example, a MAC SA and a SIP from the data packet. As previously discussed, in some embodiments, the data packet is an ARP reply packet. The SIP is them presented to the memory interface 422. The memory interface 422 performs a query on IP Lookup Table 110 using the SIP provided by the parsing engine 420. This first query is effective to access a route entry in the IP Lookup Table associated with the SIP address and retrieve a pointer from the route entry. The pointer may be an ARP pointer. The memory interface 422 performs a query of the ARP Table 130 utilizing the pointer. This second query is effective to retrieve an ARP MAC address associated with the pointer. According to embodiments of the present invention, the memory interface is adapted to retrieve information, including pointers, addresses, and the like, from one or more memories provided in a network device.

The comparator 424 compares the MAC SA from the data packet provided by the parsing engine with the ARP MAC address retrieved from the ARP Table 130. The spoofing detector 426 is utilized to detect MAC address spoofing if the MAC SA does not match the ARP MAC address. Although the comparator and the spoofing detector are illustrated as separate blocks in FIG. 4, these blocks may be combined in some embodiments.

It is understood that the various functional blocks otherwise referred to herein as processors, engines, and the like, including those shown in FIG. 4, may be included in one or more general purpose processors configured to execute instructions and data. In some embodiments, such blocks may be carried out using dedicated hardware such as an application specific integrated circuit (ASIC). In yet other embodiments, such blocks and the processing of the packets may be carried out using a combination of software and hardware. As an example, such processors include dedicated circuitry, ASICs, combinatorial logic, other programmable processors, combinations thereof, and the like. Thus, processors as provided herein are defined broadly and include, but are not limited to packet processors adapted to manage network traffic.

The above description of exemplary embodiments of the invention has been presented for the purposes of illustration and description. It is not intended to be exhaustive or to limit the scope of the invention, which is set forth in the following claims, to the precise form described. Many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of detecting address spoofing in a network packet, the method comprising:
   receiving, at a Layer 3 device, a network packet having a first source address that is associated with a first network layer and a source IP address that is associated with a second network layer;
   retrieving a destination MAC address by performing a lookup in a Layer 3 table that associates the source IP address with a next hop destination route entry, wherein the next hop destination route entry points to the destination MAC address;
   determining a source MAC address corresponding to the source IP address for the network packet using the retrieved destination MAC address; and
   comparing the determined source MAC address to the first source address of the network packet to detect address spoofing when the determined source MAC address fails to match the first source address of the network packet.

2. The method of claim 1 further comprising generating an alarm indicating the presence of a spoofing attack if a match is not present.

3. The method of claim 1 wherein the first network layer is Layer 2 and the second network layer is Layer 3.

4. The method of claim 1, wherein the Layer 3 device comprises at least one of a Layer 3 router or a Layer 3 switch.

5. A network device comprising:
   an ingress port configured to receive a network packet having a first source address that is associated with a first network layer and a source IP address that is associated with a second network layer;
   a memory interface configured to:
      retrieve a destination MAC address through a lookup in a Layer 3 table that associates the source IP address with a next hop destination route entry, wherein the next hop destination route entry points to the destination MAC address; and
      determine a source MAC address corresponding to the source IP address for the network packet using the retrieved destination MAC address; and
   a comparator configured to compare the determined source MAC address to the determined first source address of the network packet to detect address spoofing when the determined source MAC address fails to match the first source address of the network packet.

6. The network device of claim 5 further comprising an address spoofing detector configured to detect address spoofing if a match is not present.

7. The network device of claim 5 wherein the memory interface is further configured to determine the source MAC address corresponding to the source IP address using the retrieved destination MAC address in order to identify the source MAC address without looking up Layer 2 the first source address of the network packet.

8. The network device of claim 7 wherein the first source address is included in at least one of an ARP packet MAC header or an ARP packet payload.

9. The network device of claim 5 wherein the memory interface accesses a first memory and a second memory.

10. The network device of claim 5, wherein the network device is at least one of a Layer 3 router or a Layer 3 switch.

11. The method of claim 1, wherein the next hop destination route entry comprises port information related to a next hop destination device and a pointer that points to the destination MAC address.

12. The network device of claim 5, wherein the next hop destination route entry comprises port information related to a next hop destination device.

* * * * *